B. P. Coston.
Button.
N⁰ 7597.      Patented Aug. 27, 1850.

UNITED STATES PATENT OFFICE.

B. P. COSTON, OF PHILADELPHIA, PENNSYLVANIA.

SHIRT STUD AND BUTTON.

Specification of Letters Patent No. 7,597, dated August 27, 1850.

*To all whom it may concern:*

Be it known that I, BENTON P. COSTON, of the city and county of Philadelphia and State of Pennsylvania, have invented certain new and useful Improvements in the Construction of Buttons and Studs for Fastening Garments, of which the following is a full, clear, and exact description, reference being had to the accompanying drawing of the same, making part of this specification, which is a view in perspective of a shirt stud having my improvements applied thereto.

My said invention consists in making the shank of the stud of a peculiar shape whereby it is readily attached to and securely held on the garment.

The head (a) of the stud as represented in the drawing, is a disk of metal having a wire shank united to the center of its inner face, the shank projects for a short distance (1) at right angles to the head (a), it is then bent and extends for a short distance (2) parallel to the head and at right angles to the first section (1). The wire is then bent into a helix (3) the axis of which is a prolongation of the first section (1) of the shank; this helix may consist of one or more convolutions and the end of the wire may terminate, as represented in a point, in order that it may more readily penetrate the cloth to which it is to be attached, and be affixed to any part of the same without the necessity of previously making an eyelet, or may pass through both the edges to be fastened together and so dispense with both buttonholes and eyelets.

If it is required to use the stud or button where the termination of the shank in a point would be objectionable, it may be blunted, or the end may terminate in a knob. Buttons and shirt studs thus constructed may be made of any suitable material.

What I claim in the foregoing as my invention and desire to secure by Letters Patent is—

Constructing the shanks of shirt-studs and buttons in the manner and for the purpose herein set forth.

In testimony whereof I have hereunto subscribed my name.

BENTON P. COSTON.

Witnesses:
P. H. WATSON,
I. S. SMITH.